Aug. 29, 1933. R. H. KUEHMSTED 1,924,190
VOLTAGE CONTROL FOR VARIABLE SPEED GENERATORS
Filed Nov. 7, 1929 2 Sheets-Sheet 1
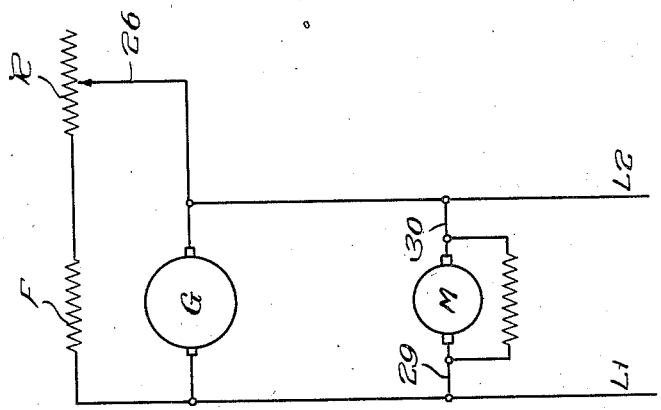
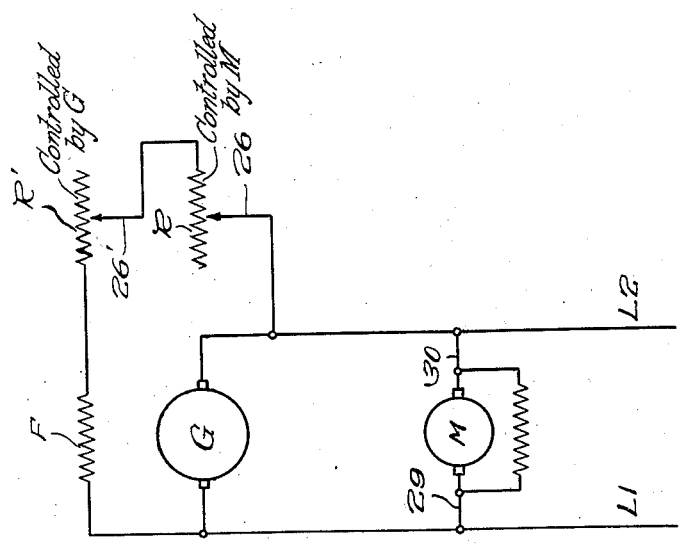
Inventor
Renfrew H. Kuehmsted Aug. 29, 1933.   R. H. KUEHMSTED   1,924,190
VOLTAGE CONTROL FOR VARIABLE SPEED GENERATORS
Filed Nov. 7, 1929   2 Sheets-Sheet 2
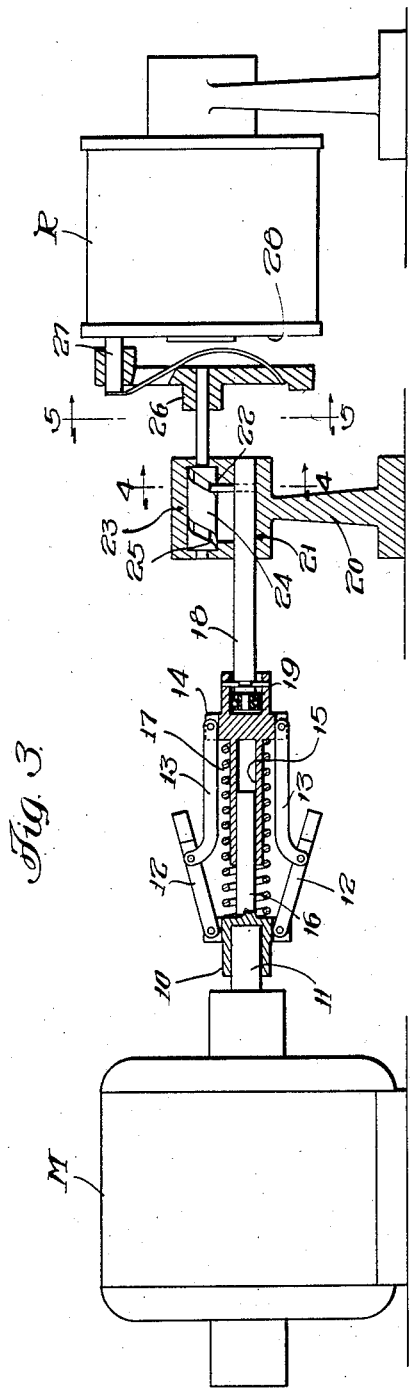
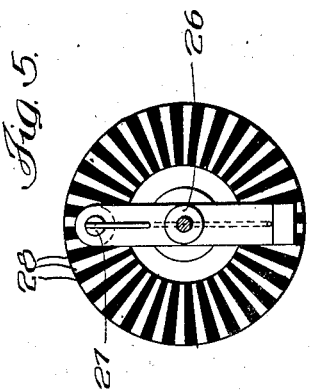
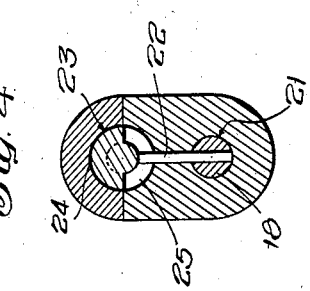
Witness
William P. Kilroy
Inventor
Renfrew H. Kuehmsted
By Charles S. Nielson
Atty.

Patented Aug. 29, 1933

1,924,190

UNITED STATES PATENT OFFICE 1,924,190

VOLTAGE CONTROL FOR VARIABLE SPEED GENERATORS

Renfrew H. Kuehmsted, Highland Park, Ill., assignor to Thompson & Jameson Corporation, Chicago, Ill., a Corporation of Illinois Application November 7, 1929. Serial No. 405,345

4 Claims. (Cl. 171—229)

This invention relates primarily to variable speed electric generators, and has for its object the accurate control of the voltage produced by such a generator, to the end that said voltage will be substantially constant, irrespective of the speed at which the generator operates.

With the above and other objects in view, as will be apparent, this invention consists in the construction, combination and arrangement of parts all as hereinafter more fully described, claimed and illustrated in the accompanying drawings; wherein:—

Fig. 1 is a diagrammatic illustration of a circuit including the present invention in conjunction with a variable speed generator having a voltage control operated from the generator;

Fig. 2 is a similar diagrammatic illustration of a circuit, including the present invention in conjunction with a variable speed generator without a voltage control operated by the generator;

Fig. 3 is an elevation of the motor forming a part of the present invention, illustrating the voltage control operated thereby in longitudinal section;

Fig. 4 is a vertical section taken along line 4—4 of Fig. 3; and

Fig. 5 is a similar section taken along line 5—5 of Fig. 3.

Heretofore the voltage produced by a variable speed generator has been controlled by increasing or decreasing the resistance in the field of the generator. This manipulation of the resistance in the field of the generator has been accomplished by a governor under the control of the speed of the generator whereby an increase in speed increases the resistance in the field and as the speed of the generator is decreased the resistance in the field is decreased. Such regulation of the voltage by placing resistance in or removing it from the field of the generator has accomplished its purpose to a certain extent but for many purposes such control of the voltage has not been sufficiently accurate.

The present invention is designed to supplement the above control to accurately maintain a constant voltage from the generator irrespective of its speed. It has been found that relatively small motors are particularly sensitive to fluctuation in voltages, in that a relatively slight increase in the voltage causes a relatively great increase in the speed of the motor. Therefore, the present invention contemplates placing a small motor to receive the current from the variable speed generator, which motor will readily respond to the various changes in voltage due to the varying speeds of the generator and in so responding will operate over a great range of speeds. A governor under the control of the speed of the motor regulates a resistance bank in series with the resistance under the control of the governor coöperating with the generator, supplementing the latter to accurately control the resistance placed in or removed from this field of the generator.

It is to be understood that the control forming the subject matter of the present invention may also be used independenly of the governor and resistance under the direct control of the speed of the generator. That is to say, the governor under the direct mechanical control of the speed of the generator and the resistance regulated thereby may be eliminated and the motor and resistance forming the subject matter of the present invention used exclusively for the regulation of the voltage generated by the generator.

Reference being had more particularly to the drawings and particularly to Figs. 3, 4 and 5 thereof, M designates the relatively small motor forming the subject matter of the present invention. This motor cooperates with a governor for the control of the resistance bank designated generally as R by means of a collar 10 secured to the end of the shaft 11 of the motor M. This collar 10 carries the arms 12 of a centrifugal governor, which arms are connected by the links 13 to a flange 14 formed at the end of a sleeve 15 operating over a stub shaft 16 carried by the collar 10. A coil spring 17 is interposed between the flange 14 of the sleeve 15 and the end of the collar 10 and surrounds both the stub shaft 16 and the sleeve 15. As the speed of the motor M and its shaft 11 increases the arms 12 of the centrifugal governor will be swung outwardly from the shaft 16 thereby drawing the sleeve 15 and its flange 14 toward the collar 10 on the shaft 11 and, reversely, as the speed of the motor M decreases the arms 12 of the centrifugal governor will drop toward the shaft 16 permitting the spring 17 to move the sleeve 15 and the flange 14 away from the collar 10. Thus the shaft 18 cooperating with the outer face of the sleeve 15 will reciprocate in one direction a distance in direct proportion to the increase of the speed of the motor M and in the other direction a distance in direct proportion to the decrease of speed of said motor. This shaft 18 is loosely connected to the sleeve 15 by means of a ball bearing 19 so that the shaft will reciprocate with the movement of the sleeve 15 but will not rotate therewith. A pedestal 20 is disposed adjoining the outer end of the shaft 18 and carries at its upper end a bearing 21 in which the outer end of the shaft 18 reciprocates. This shaft 18 has a pin 22 projecting laterally therefrom into a bearing 23 parallel to the bearing 21 for the shaft 18. A counter or auxiliary shaft 24 is mounted in the bearing 23 and is provided with a spiral groove 25 in its outer surface in which the pin of the shaft 18 is received. The outer end of the counter or auxiliary shaft 24 carries a brush holder 26, the brush 27 of which coacts with the commutator bars 28 of the resistance bank R. Therefore, as the shaft 18 reciprocates, the cooperation of the pin 22 thereof with the groove 25 in the shaft 24 will cause the latter to oscillate, swinging the brush holder 26 and brush 27 over the commutator bars 28.

The units of resistance in the resistance bank R and connected by taps to the commutator bars 28 thereof, are such that if the speed of the motor M increases the brush 27 will coact with the commutator bars 28 to render more resistance effective and as the speed of the motor M decreases the brush 27 will coact with the commutator bars 28 of the resistance bank R to render less resistance effective.

As above referred to, the present invention illustrated in Fig. 3 is used in conjunction with a variable speed generator having a control for the voltage thereof directly operable from and dependent upon the speed of the generator. This control for the voltage of a variable speed generator may in all respects be like the mechanism illustrated in Fig. 3 except that the generator is substituted for the motor M and the resistance bank R coacts with the field of the generator so that as the speed of the generator increases the resistance bank R will be regulated to throw into the field of the generator more resistance and as the speed of the generator decreases this additional resistance so put into the field of the generator will be removed. The present invention, as illustrated in Fig. 3, cooperates with the generator control above referred to but having its resistance bank R in series with the resistance bank R' of the control operated directly with the generator and in that manner the mechanism illustrated in Fig. 3 supplements the similar control which cooperates directly with the generator.

Also from the foregoing it is to be understood that the present invention as illustrated in Fig. 3 may coact and cooperate with a generator which does not have a resistance control operated directly therefrom.

In Fig. 1 is illustrated diagrammatically a circuit including the present invention as illustrated in Fig. 3 supplementing a voltage control operated directly from the generator. In this view G designates the variable speed generator and M the motor. F is the field of the generator while L1 and L2 represent the main lines leading from the generator. The motor M is tapped across the lines L1 and L2 by wires 29 and 30 so that the motor M receives the voltage of the generator G. The brush holder 26' of the governor operated directly from and by the generator coacts with the resistance bank R' which is in series with the field F of the generator. The brush holder 26 operated by the governor under the control of the motor M coacts with the resistance bank R which is in series with the resistance bank R'. In this adaptation of the invention, as illustrated in Fig. 1, the brush holder 26' is under direct control of the speed of the generator and regulates the voltage produced by the generator by increasing or decreasing the resistance R' placed in the field F of the generator G. While this is occurring the voltage of the generator G is affecting the motor M varying its speed in direct proportion to the variation in voltage created by the generator G and operating the brush holder 26 to increase or decrease the resistance R placed in the field of the generator in series with the resistance R' under the control of the brush holder 26'.

In Fig. 2 is illustrated the present invention adapted for use in connection with the generator without the use of the resistance bank R' and the brush holder 26' and the mechanism for operating it directly from the generator. In this figure G indicates the generator with the main lines L1 and L2 leading therefrom. The motor M is connected across the lines L1 and L2 by the wires 29 and 30, while the resistance R is under the control of the brush holder 26 controlled by the speed of the motor M by means of the mechanism illustrated in Fig. 3. Thus as the voltage of the generator G increases the speed of the motor M likewise increases operating the brush holder 26 to increase the resistance from the resistance bank R thrown into the shunt field of the generator G and as the voltage decreases the speed of the motor M decreases reducing the resistance in the shunt field of the generator G.

From the foregoing it is manifest that a control of the voltage of a variable speed generator is provided which is very sensitive to changes in the speed of the generator and consequently to the variances of the voltage due to the changes in speed, and which will quickly and accurately regulate the resistance in the field of the generator to maintain substantially constant voltage from the generator.

It is to be understood that the present invention may supplement a control of the voltage operated directly from the generator, such as above described or may, if desired, be the sole control of the voltage.

What is claimed is:—

1. The combination with a variable speed electric generator, of a primary variable resistance coacting therewith, means controlled by said generator for regulating said primary resistance, a motor driven by said generator, a secondary variable resistance, and means under the control of said motor for regulating said secondary resistance.

2. The combination with a variable speed electric generator, of a primary variable resistance coacting therewith, means controlled by the speed of said generator for regulating said primary resistance, a motor driven by said generator, a secondary variable resistance coacting with said primary variable resistance and means under the control of the said motor for regulating said secondary resistance.

3. The combination with a variable speed electric generator, of a primary variable resistance coacting with the field thereof, means controlled by the speed of said generator for regulating said primary resistance, a motor driven by said generator, a secondary variable resistance in series with said primary resistance, and means under the control of the speed of said motor for regulating said secondary resistance.

4. The combination with a variable speed electric generator, of a primary resistance coacting therewith, means controlled by the speed of said generator for regulating said primary resistance, a secondary variable resistance coacting with said generator, and means under the control of the voltage of said generator for regulating said secondary resistance.

RENFREW H. KUEHMSTED.